No. 860,890. PATENTED JULY 23, 1907.
E. WILSON.
MUSIC INDICATOR.
APPLICATION FILED FEB. 17, 1906. RENEWED JAN. 17, 1907.
2 SHEETS—SHEET 1.
Fig. 1.
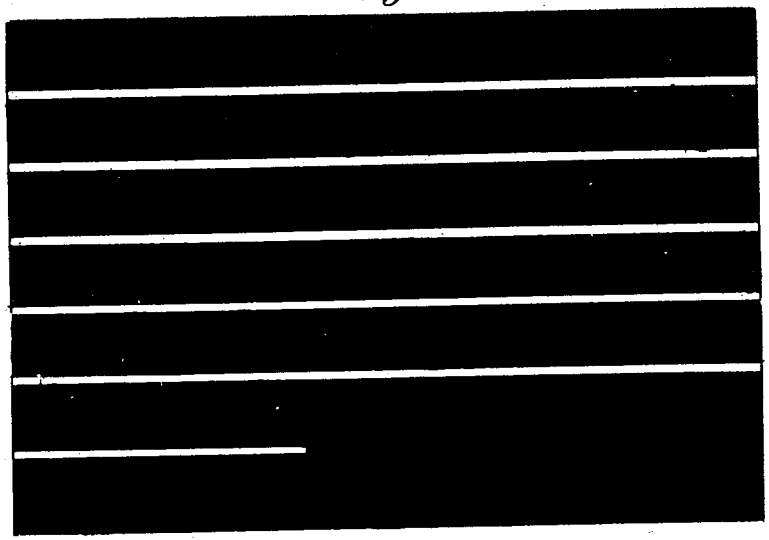
Fig. 2
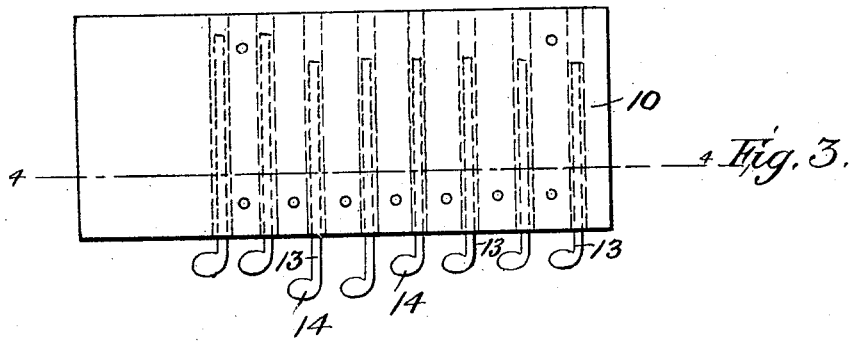
Fig. 3.
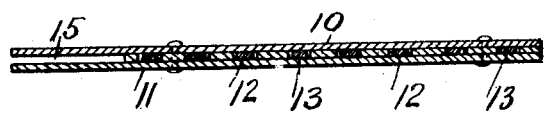
Fig. 4.
WITNESSES:
INVENTOR:
Ebenezer Wilson,
By
Attorneys No. 860,890. PATENTED JULY 23, 1907.
E. WILSON.
MUSIC INDICATOR.
APPLICATION FILED FEB. 17, 1906. RENEWED JAN. 17, 1907.
2 SHEETS—SHEET 2.
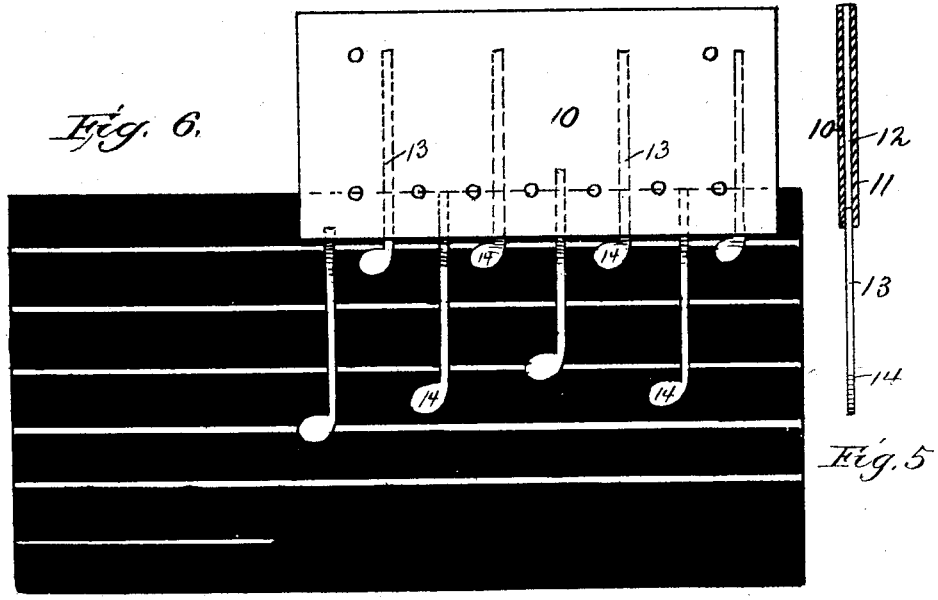
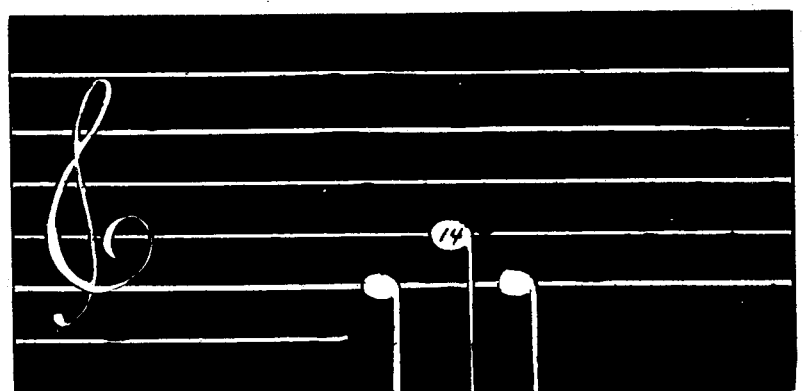
WITNESSES:
INVENTOR:
Ebenezer Wilson,
By
Attorneys

UNITED STATES PATENT OFFICE.

EBENEZER WILSON, OF FINDLAY, OHIO.

MUSIC-INDICATOR.

No. 860,890.  Specification of Letters Patent.  Patented July 23, 1907.

Application filed February 17, 1906, Serial No. 301,650. Renewed January 17, 1907. Serial No. 352,813.

*To all whom it may concern:*

Be it known that I, EBENEZER WILSON, a citizen of the United States, residing at Findlay, in the county of Hancock and State of Ohio, have invented certain new and useful Improvements in Music-Indicators, of which the following is a specification.

My invention has relation to means for teaching music through the medium of an indicator in which a certain number of notes of mechanical construction and capable of manual movement on a staff may be made to show any desired tune; and when the indicator is placed upon the staff to indicate a certain cadence, then each movement of the indicator either up or down, produces different cadences. There may be different forms and arrangements of the means mechanically. As herein shown the staff may be drawn upon a piece of thin board or cardboard or other means suitable to the purpose. The indicator proper in the present instance, is shown as consisting of two sheets of cardboard, wood, metal or other substance, fastened together, leaving vertical spaces for stems carrying the musical signs to move up and down in them, to admit of the indicator carrying the notes, musical signs, &c., to have the latter moved about with respect to each other.

Reference is to be had to the annexed drawings and to the figures of reference marked thereon which form a part of this specification, and in which—

Figure 1 designates a face view of the staff board. Fig. 2 is a vertical sectional view thereof taken on a line near the left end. Fig. 3 is a face view of the indicator. Fig. 4 is a horizontal sectional view of Fig. 3. Fig. 5 is a vertical sectional view of Fig. 4. Fig. 6 shows a face view of the staff with the indicator in use in connection therewith. Fig. 7 shows a clef in use with the staff and indicator.

In the drawings 10 designates the face-board and 11 the back-board of the indicating device, between which at desired intervals there are vertical spaces, 12, adapted to have the stems, 13, of the notes, signs, or marks, 14, relating to music, extend and resulting from the interposition of vertical strips therebetween as seen in Fig. 3. At the left-hand end of the board there are spaces, 15, similar to those marked 12 for the reception of the stems the clef and other signs. The stems, 13, may be made to extend in any direction and to have any form that is most desirable or that may be most useful.

It is intended to use the invention chiefly as a means for teaching the rudimentary principles of music in every way and by every mode that may be found useful.

The indicator can be made of any length or width desired. Any shape or size of notes—whole, half or quarter notes, &c., with corresponding rests &c., can be used—and other characters, signs &c., connected with the teaching of music may be employed; and it may be used in connection with other devices for the purpose without departing from the nature or spirit of the invention.

The following will indicate the working of same.

*1st Position.*

| 1 | 2 | 3 | 2 | 1 |
| Do | Re | Mi | Re | Do |
| g | a | b | a | g |

With indicator raised one degree expresses the following:

| | | | | | | |
|---|---|---|---|---|---|---|
| 2nd position, | 2 | 3 | 4 | 3 | 2 | |
| 3rd " | 3 | 4 | 5 | 4 | 3 | |
| 4th " | 4 | 5 | 6 | 5 | 4 | |
| 5th " | 5 | 6 | 7 | 6 | 5 | |
| 6th " | 6 | 7 | 8 | 7 | 6 | |
| 7th " | 7 | 8 | 2 | 8 | 7 | |
| 8th " | 1 | 2 | 3 | 2 | 1 | |

Thus changing the reading eight times, which would require forty notes to be written, to express the same number of cadences without the use of the indicator. Then by inverting the indicator, it expresses, without changing the notes therein, the following result:

| First position, | 8 | 7 | 6 | 7 | 8 |
| Second " | 7 | 6 | 5 | 6 | 7 |
| Third " | 6 | 5 | 4 | 5 | 6 |
| Fourth " | 5 | 4 | 3 | 4 | 5 |
| Fifth " | 4 | 3 | 2 | 3 | 4 |
| Sixth " | 3 | 2 | 1 | 2 | 3 |
| Seventh " | 2 | 1 | 7 | 1 | 2 |
| Eighth " | 1 | 7 | 6 | 7 | 1 |

This with the others named, will make eighty notes represented by one five note cadence of the indicator. This can be repeated *ad infinitum.*

It is my purpose also to employ a blackboard or something the equivalent thereof in connection with the indicator and staff, on which I propose to express in words or other signs what is represented by the staff and indicator, as I have done hereinbefore on which the paper bearing the figures following the indicators, staves, &c., has been expressed. I need nothing further to express the usefulness of a blackboard or a device of equivalent character in connection with the other parts of the invention to render it fully useful in many respects.

In addition to the uses I have mentioned for my invention there are doubtless many others that will be found of value and importance by music teachers and others, and that may be employed in connection with what is pointed out in the claims expressed by me, and of these I propose to take advantage in the employment and application of my invention.

It will be observed that through my indicator it is repeated, the notes &c., can be arranged therein by moving them out different distances to represent any cadence or tune.

Again, it is to be kept in mind that by my indicator when a certain cadence or tune is arranged therein, by raising or lowering the indicator on the staff a different cadence is shown by each new position of the indicator.

I claim:

1. A device of the character described, comprising a board having a face-member and a back-member, with intervening vertical spaces therebetween, opening out through the top and bottom edges thereof and mechanical musical characters having their stems effective for insertion into said vertical spaces for the projection of their opposite end-portions beyond said bottom and top edges.

2. A contrivance for objectively teaching rudimentary music comprising a board with the musical staff thereon and a second board composed of a back-member and a face-member, with intervening vertical spaces therebetween opening out through the top and bottom edges of the latter board and mechanical musical characters, said spaces being effective for the reception of the stems of said characters and for the reading of the suggestive or indicia portions of said characters upon said staff from above or from below.

3. A device of the character described, comprising a board with the musical staff thereon, and an additional board composed of a face-member and a back-member, with intervening vertical spaces therebetween opening out through the top and bottom edges thereof, and mechanical musical characters, said spaces being effective for the reception of the stems of said characters and the opposite end indicia portions of said characters projecting beyond either of said edges for reading upon said staff from above or from below.

In testimony whereof I have signed my name to this specification in the presence of two subscribing witnesses.

EBENEZER WILSON.

Witnesses:
CHARLES A. STOCKTON,
EMMA J. STOCKTON.